(12) United States Patent
Li

(10) Patent No.: US 6,488,234 B2
(45) Date of Patent: Dec. 3, 2002

(54) SECURING LOCK FOR AIRCRAFT TROLLEYS IN TURBULENCE

(75) Inventor: Xiaoping Li, Singapore (SG)

(73) Assignee: The National University of Singapore, Singapore (SG)

(*) Notice: Subject to any disclaimer, the term of this patent is extended or adjusted under 35 U.S.C. 154(b) by 0 days.

(21) Appl. No.: 09/859,418

(22) Filed: May 18, 2001

(65) Prior Publication Data

US 2002/0014556 A1 Feb. 7, 2002

Related U.S. Application Data

(60) Provisional application No. 60/205,074, filed on May 18, 2000.

(51) Int. Cl.$^7$ ..................... A64D 11/00; B60G 17/005
(52) U.S. Cl. ........................... 244/118.5; 244/118.5; 267/64.12; 186/40; 280/5.5
(58) Field of Search .................. 244/118.5, 118.1, 244/137.1; 186/40, 46; 267/64.12, 64.26, 136; 280/5.5, 5.507, 5.515

(56) References Cited

U.S. PATENT DOCUMENTS

| 3,473,487 | A | * | 10/1969 | Blunden |
| 3,751,101 | A | * | 8/1973 | Miller et al. ................. 186/40 |
| 3,823,900 | A | * | 7/1974 | Marechal ................. 244/118.5 |
| 4,138,950 | A | * | 2/1979 | Mooney et al. |
| RE30,896 | E | * | 4/1982 | Jenkins et al. ............ 267/64.26 |
| 4,921,272 | A | * | 5/1990 | Ivers |
| 5,039,123 | A | * | 8/1991 | Smeitink |
| 5,316,326 | A | * | 5/1994 | Kyriacou |
| 5,743,701 | A | * | 4/1998 | Green |

* cited by examiner

Primary Examiner—Charles T. Jordan
Assistant Examiner—Lulit Semunegus
(74) Attorney, Agent, or Firm—Birch, Stewart, Kolasch & Birch, LLP

(57) ABSTRACT

An apparatus for preventing trolleys of aircraft during turbulence from leaving the floor of said aircraft includes a securing lock installed on a trolley of an aircraft for sensing the gravity on the trolley. Control is provided to prevent the action of the trolley from leaving the floor of the aircraft during turbulence. An actuation of the securing lock occurs for preventing the trolley from leaving the floor of the aircraft during turbulence. The securing lock includes a blade locking system for preventing the trolley on an aircraft during turbulence from leaving the floor of the aircraft by holding the trolley onto the seats adjacent to an aisle with extendable blades.

14 Claims, 5 Drawing Sheets

SECURING LOCK FOR AIRCRAFT TROLLEYS IN TURBULENCE

This application claims priority on provisional Application No. 60/205,074 filed on May 18, 2000, the entire contents of which are hereby incorporated by reference.

FIELD OF INVENTION

This invention relates to an apparatus and a method for securing aircraft trolleys during turbulence.

BACKGROUND OF THE INVENTION

In December 1995, a number of aircraft passengers and the crew members of the Cathay Pacific airlines were reported to have been badly injured by flying food trolleys when the aircraft met turbulence. In the early 1998, the same event also occurred on a United Airlines flight. The reasons that caused the food trolleys to fly and then fall down onto the passengers and crew members were due to the changes in the aircraft acceleration caused by turbulence. The changes of aircraft acceleration first resulted in the disappearance of gravity that holds the trolleys on the floor of aircraft and then resulted in a return of the gravity that pulled the flying trolleys back to the floor of the aircraft. For the safety of the people in aircraft, the aircraft trolleys should have a securing lock that prevents the trolleys from leaving the floor of aircraft regardless of the changes in aircraft acceleration. There has been no prior art found in this regard.

SUMMARY AND OBJECTS OF THE INVENTION

It is the primary object of the invention to provide a method for securing aircraft trolleys during turbulence and an apparatus for performing the method.

According to the invention in the first aspect there is provided a method of securing aircraft trolleys during turbulence comprising the steps of preventing the trolleys from leaving the floor of aircraft during turbulence.

According to the invention in a second aspect there is provided a method of securing the aircraft trolleys during turbulence comprising the step of sensing the disappearance of gravity on the trolleys of the aircraft during turbulence, controlling the action of preventing the trolleys from leaving the floor of the aircraft during turbulence, and executing the action of preventing the trolleys from leaving the floor of aircraft during turbulence.

In a third and fourth aspect of the invention, an apparatus for preventing aircraft trolleys from leaving the floor of aircraft during turbulence is provided for performing the methods of the first and second aspects.

Further features of the invention may be found in the appended claims.

In the described embodiments of the invention, a method for securing aircraft trolleys during turbulence is disclosed. In this method, the trolleys are secured by preventing them from leaving the floor of the aircraft during turbulence. The method comprises the steps of, sensing the disappearance of gravity on aircraft trolleys during turbulence, controlling the action of preventing the trolleys from leaving the floor of the aircraft and executing the action of preventing the trolleys from leaving the floor of aircraft. A securing lock for the aircraft trolleys during turbulence is disclosed, which provides a primary function that is capable of preventing the trolley from leaving the aisle floor when the aircraft encounters turbulence.

The securing lock is installed on aircraft trolleys. At the instance when the aircraft meets turbulence, if the turbulence is so strong that a trolley leaves the floor of the aircraft because of the disappearance of gravity on the trolley, the securing lock will be triggered to prevent the trolley from leaving the floor. An apparatus for the securing lock is disclosed, including a blade locking system which locks a trolley of the aircraft during turbulence by holding it onto the seats adjacent to an aisle with built in blades, and a vacuum sucking system which adheres the trolley of the aircraft during turbulence to the floor of aircraft by vacuum sucking.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Trolleys are used in aircraft for distributing goods and other purposes. An aircraft may meet air turbulence during a flight. The turbulence may cause the aircraft to accelerate in a direction such that gravity on a trolley located within an aircraft disappears and the trolley fly up from the floor of the aircraft. The present invention provides a securing lock to prevent the trolleys from flying up from the floor of aircraft during turbulence. The securing lock is installed in aircraft trolleys. It comprises a sensing unit, a control unit, and an execution unit.

Figure 1:
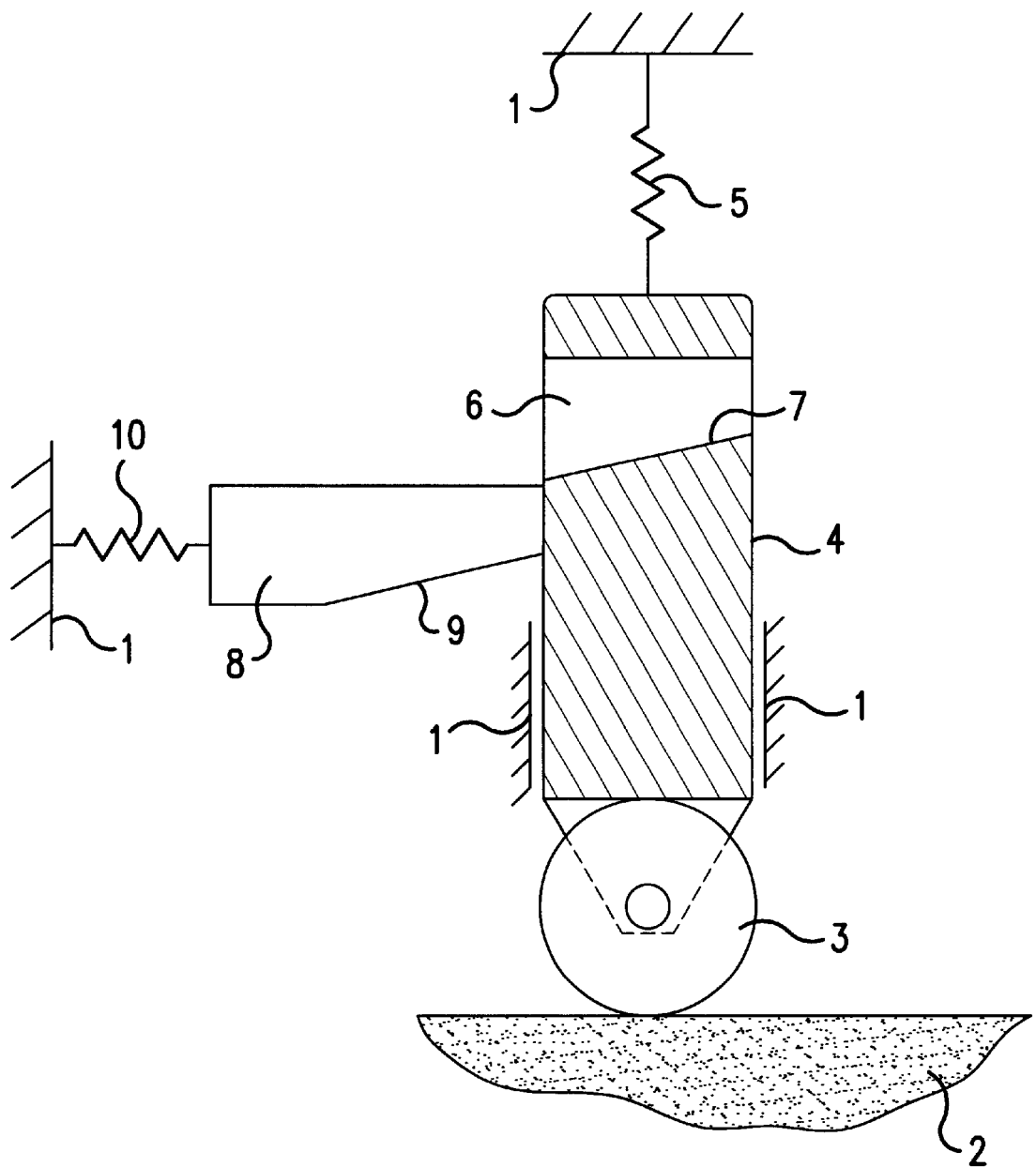
FIG. 1 is a schematic view of one embodiment of the sensing unit and control unit of the blade locking system for the securing lock of the present invention.
Figure 2:
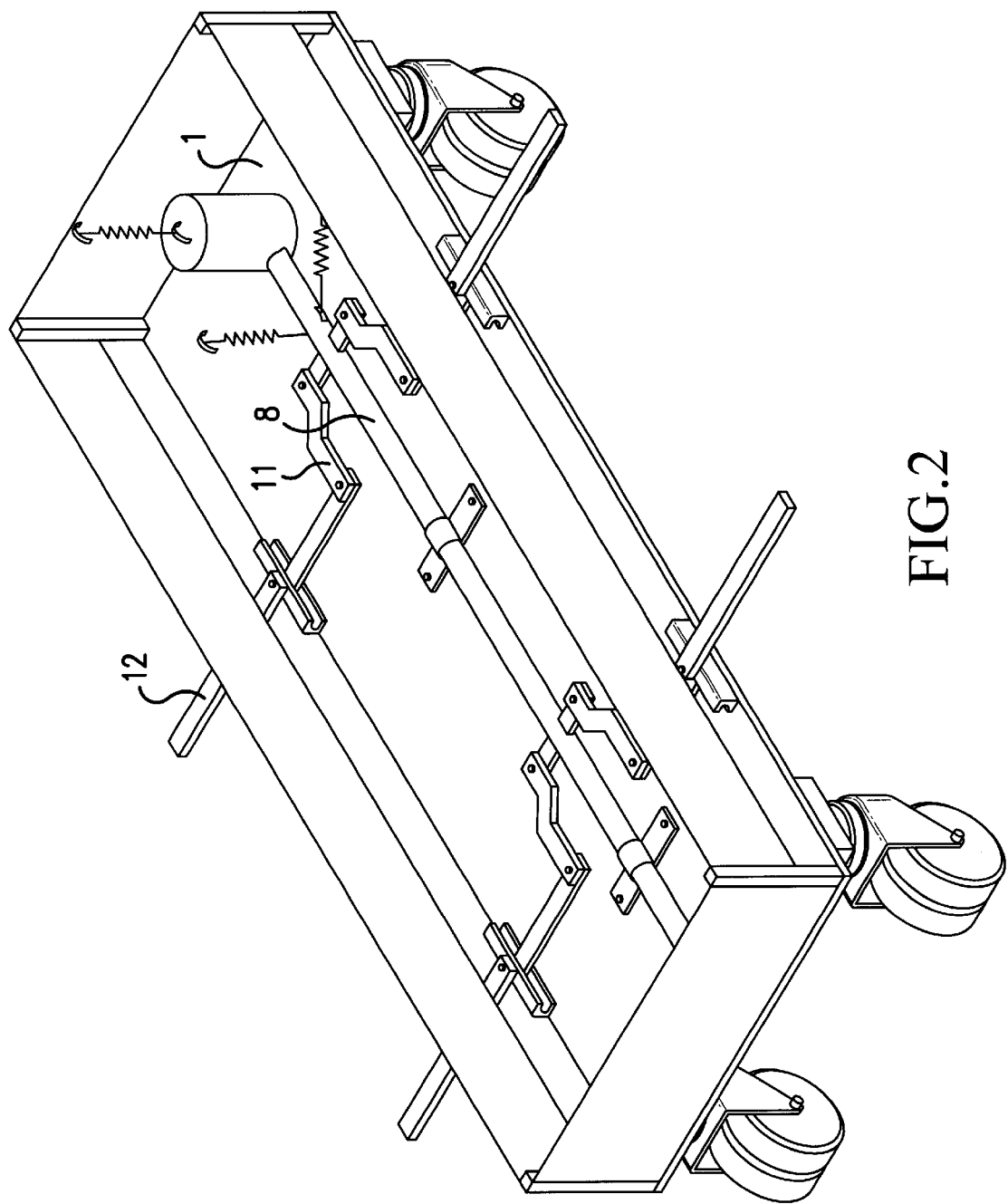
FIG. 2 is a perspective view of one embodiment of the execution unit of the blade locking system for the securing lock of the present invention.
Figure 3:
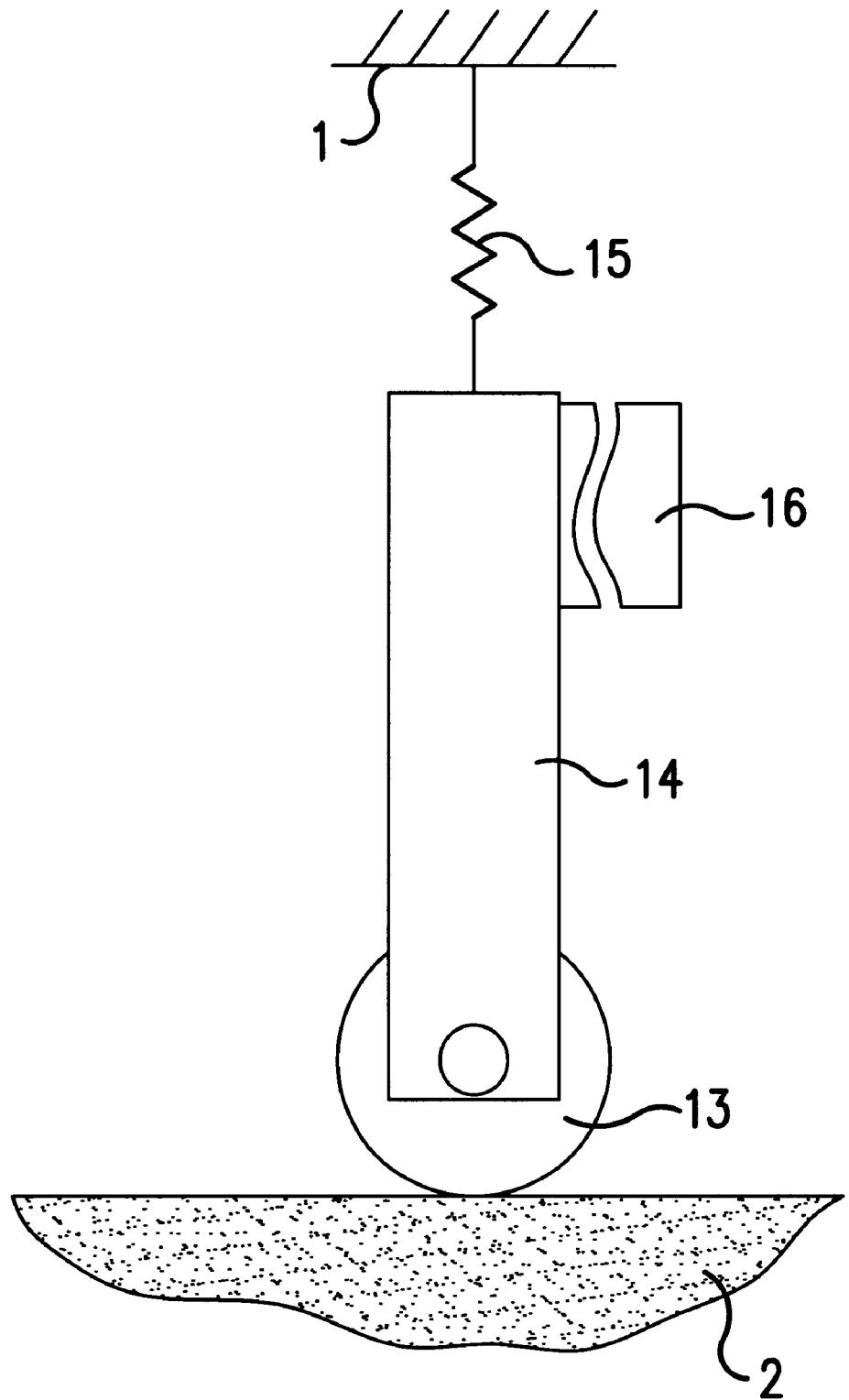
FIG. 3 is a schematic view of one embodiment of the sensing unit and control unit of the vacuums sucking system for the securing lock of the present invention.

As one of the embodiments of the securing lock system of the present invention, a blade locking system for the trolleys located within a passenger aircraft is disclosed. The sensing unit and control unit are shown in FIG. 1. The system is installed on the trolley body 1. The sensing unit is formed by the aisle floor 2, the sensing wheel 3 held by the cylinder 4, and the sensing spring 5 which links to the trolleys body and pushes constantly against the cylinder 4 together with a sensing wheel 3 against aisle floor 2. The control unit is formed by the hole 6 having a slanted plane 7, the rod 8 having a slanted plane 9 and the execution spring 10 pushing the rod 8 against the cylinder 4. The execution unit of the blade locking system is shown in FIG. 2. It is formed by the rod 8, the blade locking transmission sets represented by 11, and the blades represented by 12.

During flying conditions without air turbulence, the blade locking system has its blades 12 retracted, i.e. the blades are kept inside the trolley body. At the moment of turbulence, if the aircraft acceleration in the direction opposite to the direction of gravity is so large that the gravity on the trolley disappears, the sensing wheel 3 will tend to be separated from the aisle floor 2. The sensing spring S will then push the cylinder 3 together with the sensing wheel 3 outwards such that the hole 6 meets the rod 8 and the rod 8 is pushed into the hole 6 by the execution spring 10. The blade locking action will then be trigged. The moving rod 8 will open the blades 12 through the transmission sets 11, such that the blades 12 will be held by the passenger seats on both sides of the aisle, preventing the trolley from flying up. When the turbulence is over, gravity returns to the trolley and the force from the aisle floor 2 on the sensing wheel 3 will be large enough for the rod 8 being pushing out from the hole 6 along the slanted plane 7. The rod 8 together with the transmission sets 11 and blades 12 will then return to their original positions.

The slanted angle α for both the planes 7 and 9 is designed such that on one hand of the rod 8 is able to move a long enough distance for opening the blades 12, and on the other hand, the rod 8 can be pushed out from the hole 6 along the slanted plane 7 by the force from the floor 2 on the sensing wheel 3 when turbulence is over and gravity returns to the trolley.

The blades 12 and transmission sets 11 are designed in such a way that when the blades 10 are opened they are securely held by the passenger seats on both sides of the aisle.

Figure 4:
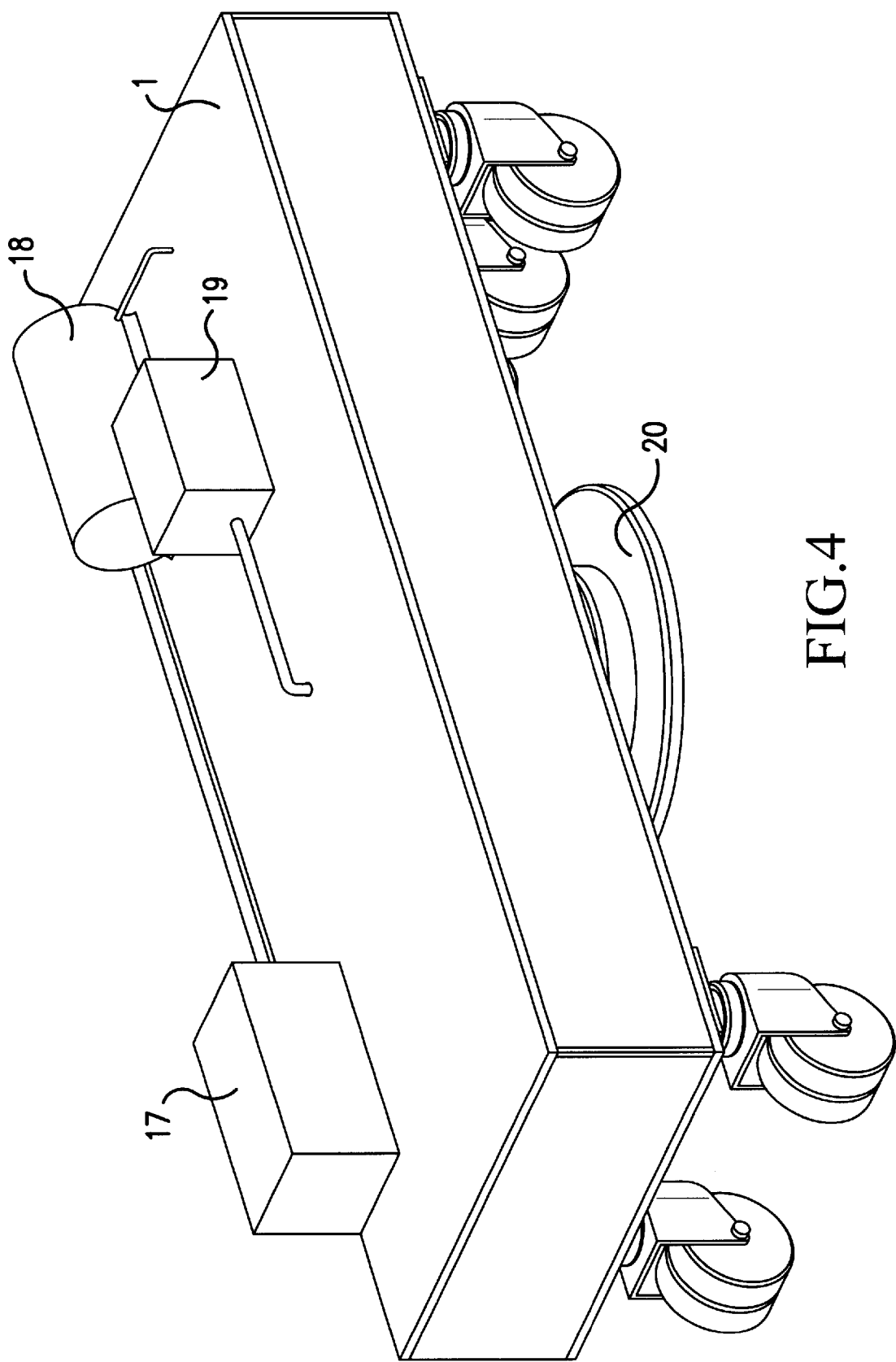
FIG. 4 is a perspective view of one embodiment of the execution unit of the vacuum sucking system for the securing lock of the present invention.
Figure 5:
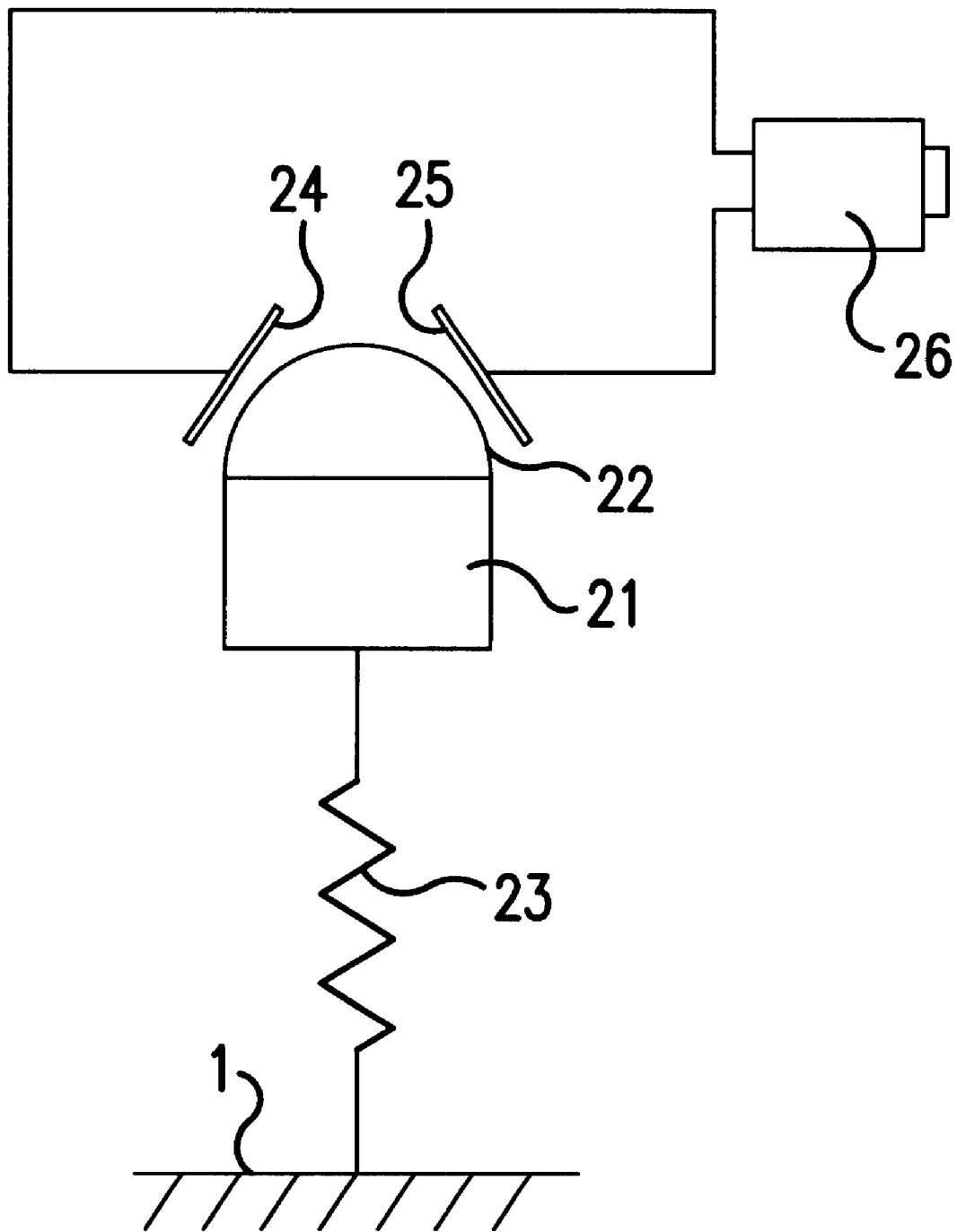
FIG. 5 is a schematic view of the one embodiment of the gravity sensing switch for sensing and controlling the vacuum sucking system for the securing lock of the present invention.

As another embodiment of the securing lock of the present invention, a vacuum sucking system is disclosed. The sensing unit and control unit of the system are shown in FIG. 4. The sensing unit is formed by the sensing wheel 13 held by the cylinder 14, and the sensing spring 15 which links to the trolley body 1 and pushes constantly the cylinder 14 together with the wheel 13 against the floor 2. The control unit is formed by a position switch 16 mounted on both the cylinder 14 and the body of the trolley. The execution unit of the system is shown in FIG. 5. It is formed by the power supply 17, the motor 18, the pump 19, and the vacuum sucking plate 20.

During flying conditions without air turbulence, the sensing wheel 13 is pressed by the floor 2, the position switch 16 is off, the motor 18 and pump 19 are at rest, and the vacuum sucking plate 20 is not in contact with the floor 2. At the moment of turbulence, if the aircraft acceleration in the direction opposite to the direction of gravity is so large that the gravity on the trolley disappears, the sensing wheel 13 will tend to be separated from the floor 2. The sensing spring 15 will then push the cylinder 14 together with the sensing wheel 13 outwards such that the position switch 16 is on. The motor 18 and pump 19 will then run so that the vacuum sucking plate 20 adheres to the floor 2. When turbulence is over, gravity returns to the trolley and the sensing wheel 13 and cylinder 14 will be pushed back by the floor 2 so that the position switch 16 is off. The motor 18 and pump 19 will then stop, and the vacuum sucking plate 20 will leave the floor 2.

In the vacuum sucking system for securing the lock of the present invention, the sensing unit can be in the form of any gravity meter that senses gravity on the trolley, and the control unit can be in the form of any control device that receives signal from the sensing unit and switches on or off the execution unit.

In the vacuum sucking system for the securing lock of the present invention, the sensing unit and control unit can be in the form of a sensing switch, as shown in FIG. 5. It is formed by a sensing-connector 21 having a conductive curved face 22, a sensing spring 23 which links the sensing-connector 21 to the trolley body 1, and the connecting faces 24 and 25 linking to the execution unit 26. During flying conditions without turbulence, the gravity on the sensing-connector 21 makes separates the faces 22, 24 and 25 and the execution unit is switched off. At turbulence, if the aircraft acceleration in the direction opposite to the direction of gravity is so large that gravity on the sensing-connector 21 disappears, the sensing-connector 21 will be pushed up by the sensing spring 23 and faces 22, 24 and 25 will be in contact, making on the switch for the execution unit 26. When the turbulence is over, gravity returns to the sensing-connector 21 and pushes it down. Faces 22, 24 and 25 will then be separated and the execution unit 26 is switched off.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for preventing trolleys on an aircraft during turbulence from leaving the floor of said aircraft, comprising:

a securing lock installed on a trolley of an aircraft for sensing the gravity on said trolley, controlling the action of preventing said trolley from leaving the floor of said aircraft during turbulence, and executing an actuation of the securing lock for preventing said trolley from leaving the floor of said aircraft during turbulence.

2. The apparatus according to claim 1, wherein the securing lock comprises a blade locking system for preventing a trolley of an aircraft during turbulence from leaving the floor of said aircraft by holding said trolley onto the seats adjacent to an aisle with extendable blades.

3. The apparatus according to claim 2, and further comprising a sensing unit formed by a wheel, cylinder and spring system for sensing the gravity on said trolley.

4. The apparatus according to claim 2, and further comprising a control unit formed by a cylinder, spring and rod system for receiving signals from the sensing unit and for controlling an execution unit.

5. The apparatus according to claim 2, and further comprising a execution unit formed by a rod, transmission and blade system for preventing said trolley from leaving the floor of said aircraft by having the extendable blades held by the seats of aisle.

6. The apparatus according to claim 1, wherein the securing lock further comprises a vacuum sucking system for preventing a trolley of an aircraft during turbulence from leaving the floor of said aircraft by adhering said trolley to the floor of said aircraft through vacuum sucking.

7. The apparatus according to claim 6, and further comprising a sensing unit formed by a wheel, cylinder and spring system for sensing the gravity of said trolley and for transmitting the sensed signals to a control unit.

8. The apparatus according to claim 6, and further comprising a control unit formed by a cylinder and position switch system for receiving signals from a sensing unit and for controlling an execution unit.

9. The apparatus according to claim 6, and further comprising an executing unit for adhering said trolley to the floor of said aircraft by vacuum sucking.

10. The apparatus according to claim 7, and further comprising a gravity meter for sensing the gravity of said trolley and for transmitting the sensed signals to a control unit.

11. The apparatus according to claim 8, and further comprising a signal receiving and processing system for receiving signals from a sensing unit and for controlling an execution unit.

12. The apparatus according to claim 6, and further comprising a gravity sensing switch operatively connected to said securing lock.

13. A method for preventing trolleys on an aircraft during turbulence from leaving the floor of said aircraft, comprising the following steps:

sensing the gravity on said trolley;

controlling the action of preventing said trolley from leaving the floor of said aircraft during turbulence; and executing an actuation of a securing lock for preventing said trolley from leaving the floor of said aircraft during turbulence.

14. The method according to claim 13, and further including the step of holding said trolley onto seats adjacent to an aisle with extendable blades for preventing a trolley of an aircraft during turbulence from leaving the floor of said aircraft.

\* \* \* \* \*